United States Patent Office 3,014,710
Patented Dec. 26, 1961

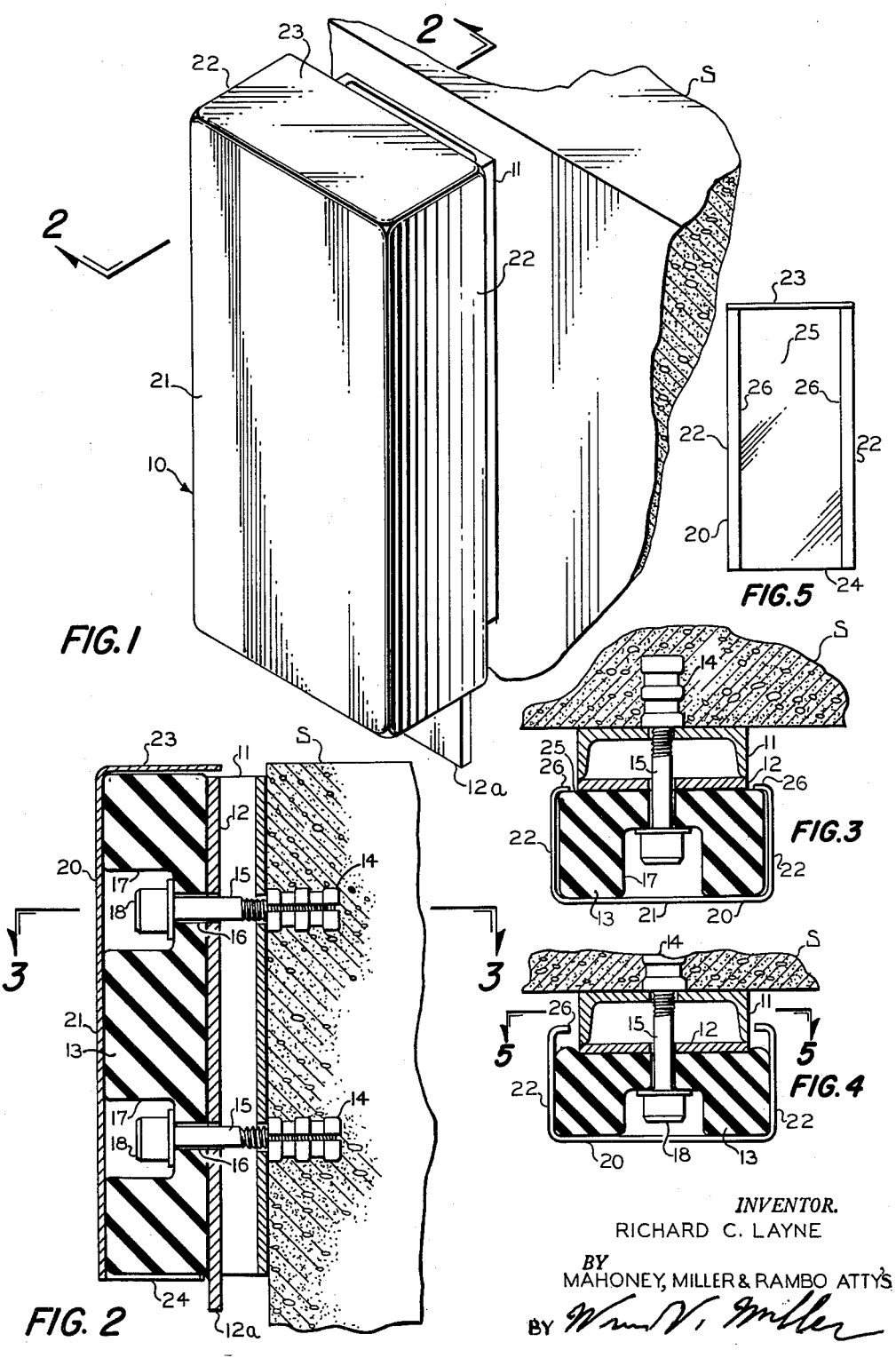

3,014,710
SHOCK-ABSORBING BUMPER
Richard C. Layne, Columbus, Ohio, assignor to Auto-Mechanical Dock Board, Inc., Columbus, Ohio, a corporation of Ohio
Filed Feb. 8, 1960, Ser. No. 7,257
3 Claims. (Cl. 267—1)

My invention relates to a shock-absorbing bumper. It has to do, more particularly, with a bumper structure which may be mounted on a dock or other structure against which a truck is designed to back for loading and unloading.

Most bumpers of this type are made of wood in the form of timbers which are securely fastened to the dock or other structure to prevent damage thereto. However, this type of bumper does not adequately absorb the shock but merely prevents damage to the dock or structure and even permits damage to the truck backing thereagainst. It has been proposed to cover this type of wooden timber bumper with rubber in order to more effectively absorb the shock of contact and to protect the truck. However, this rubber, because it is directly contacted by the truck, will soon become worn or torn so that it must be replaced frequently.

The main object of this invention is to provide a bumper structure which can be easily mounted on a dock or other building structure to absorb the shock of a truck contacting therewith, which will effectively protect the dock or other structure, and which will prevent serious damage to the truck.

Another object of this invention is to provide a bumper structure which includes yieldable or compressible cushion material, preferably live rubber, that will more effectively absorb the shock but which is protected from direct contact with the truck so that it will not become worn or torn by such contact.

Another object of my invention is to provide a bumper structure of the type indicated wherein the live rubber cushion may be replaced after long periods of use if its liveliness has been reduced by age.

Various other objects will be apparent.

The preferred embodiment of my invention is illustrated in the accompanying drawing but it is to be understood that specific details thereof may be varied without departing from basic principles.

In the drawing:

FIGURE 1 is an isometric view showing a bumper structure embodying my invention.

FIGURE 2 is a vertical sectional view taken along line 2—2 of FIGURE 1.

FIGURE 3 is a horizontal sectional view taken along line 3—3 of FIGURE 2.

FIGURE 4 is a view similar to FIGURE 3 but showing the cushion element compressed in the shock-absorbing operation.

FIGURE 5 is a rear elevational view of the removed contact member and housing for the live rubber cushion.

With reference to the drawing, I have illustrated my bumper structure mounted on a rigid structure S which may be the outer edge of a dock or other structure which it is desired to protect from direct contact with a truck or other vehicle moved into association therewith. My bumper structure or unit, which is indicated generally by the numeral 10, may be provided in any suitable number or arrangement on the structure S.

The unit 10 preferably embodies a back-up spacer member in the form of an outwardly opening channel 11 which is disposed in flat contact with the face of the structure S. Outside the channel 11 and in engagement with the outer edges thereof is a block assembly including cushion-mounting flat plate 12. The plate 12 covers substantially the same area as the channel 11 and to complete the block assembly has molded onto its outer face a block 13 of live rubber or other suitable compressible or yieldable material. This block 13 is of slightly greater width than the plate 12. It has the characteristic of compressing and expanding repeatedly with the application of and removal of compressive force.

The coperating channel 11, and the block assembly consisting of the plate 12 and the block 13 carried thereby may be fastened to the structure S in various ways but the arrangement shown in FIGURE 2 is preferable. The structure S is provided with anchor sleeves 14 of the expansion type into which bolts 15 are threaded after passing through aligning openings and bores in the respective members 11, 12 and 13. Each bore 16 in the rubber block 13 is countersunk at its outer end, as indicated at 17, to receive the head 18 on the outer end of the bolt 15 so that the head will be embedded substantially in the rubber block. The head 18 is angularly shaped for receiving a tool by means of which it may be rotated to clamp the plate 12 to the angle 11 or to release it for the purpose of removing and replacing the rubber block 13. Obviously, the block 13 and plate 12 are removed and replaced as a unit.

In order to protect the rubber block 13 but to still permit compression thereof in the shock-absorbing operation, a contact and housing member 20 is provided. This member is preferably made of sheet metal and includes the main contact outer wall 21 which is vertically disposed, the vertically disposed side walls 22 and the top wall 23. It is completely open at its bottom, as indicated at 24, and is open at its rear side, as indicated at 25, but does have inwardly projecting flanges 26 along the inner margins of the side walls 22 thereof, as shown best in FIGURE 5. With this arrangement, the housing 20 can be slipped downwardly over the rubber block 13 carried by the plate 12, the top wall 23 contacting the top of the plate 12 and block 13 to limit downward movement thereof. Thereafter, the flanges 26 at the sides of the member 20 will cooperate with the rubber block 13 at its adjacent rear or inner surface to prevent outward movement of the cover 20 off the rubber block. The flanges 26 will extend inwardly towards the edges of the plate 12 (FIGURE 3) but will not contact therewith. Therefore, the housing 20 will be free to move inwardly and outwardly upon compression or expansion of the rubber block 13. When the block 13 is expanded, the flanges 26 are in contact with the inner surface of the block 13, as shown in FIGURE 3. When the block 13 is compressed, the flanges 26 are closely adjacent the outer flanges of the channel 11, as shown in FIGURE 4. Thus, the flanges 26 will cooperate with the channel 11 to guide in and out movement of the cover 20. It will be noted that the plate 12 extends downwardly below the lower end of the cushion block 13 as indicated at 12a.

It will be apparent that with this arrangement, the live rubber block 13 will be protected from direct contact with the truck moving into association therewith and, therefore, wear and tear on the surface of the block 13 will be prevented. The truck will contact the housing 20 and will merely compress the block 13. If, after long periods of use the block 13 loses its liveliness, it can be replaced through removal and replacement of the plate 12 which carries it, the bolts 15 permitting this. It will be apparent that this bumper unit will effectively absorb shock and will prevent damage to the truck as well as to the structure on which it is mounted. It will further be apparent that although the structure is very effective for its purpose, it is simple and inexpensive.

Various other advantages will be apparent.

Having thus described my invention, what I claim is:

1. A shock-absorbing bumper comprising a shock-absorbing block of live rubber material, a rigid mounting member to which said first block is secured in flat contact therewith, said rigid member being adapted to be fastened to a suitable supporting structure in flat contact therewith, said compressible block in non-compressed condition extending laterally beyond adjacent edges of the mounting member, a contact member and housing disposed over the compressible block, said housing having an open lower end and an open rear side with flanges at the rear side which extend laterally inwardly towards the adjacent edges of the mounting member and behind the adjacent rear surfaces of the rubber block.

2. A structure according to claim 1 in which the rubber block is of greater width than the mounting member and extends outwardly beyond the side edges thereof, said housing having the flanges at its rear side along the rear margins of its side walls so as to extend behind the corresponding portions of the rear surface of the rubber block.

3. A shock absorbing bumper comprising a shock absorbing block assembly including a block of compressible material secured in contact with a rigid mounting plate, a back-up spacer member adapted to be disposed between said plate and a supporting structure upon which the bumper is to be mounted, said spacer being of less width than the overall width of said block assembly, a rigid contact member and housing disposed over the block assembly to prevent direct contact with the compressible block thereof, said housing having an open lower end and an open rear side with retaining flanges at the rear side which extend laterally over the rear side of the block assembly toward the back-up spacer member so that said flanges will move rearwardly and forwardly relative to the spacer member upon compression and expansion of said compressible block by rearward and forward movement of the housing upon force being applied thereto and relaxed but said flanges engaging the extended portion of the block assembly upon expansion of the compressible block to prevent forward displacement thereof from the block assembly.

References Cited in the file of this patent

UNITED STATES PATENTS

| | | |
|---|---|---|
| 523,422 | Bailey | July 24, 1894 |
| 2,578,291 | Dickson | Dec. 11, 1951 |
| 2,685,269 | Manson | Aug. 3, 1954 |

FOREIGN PATENTS

| | | |
|---|---|---|
| 1,151,606 | France | Aug. 26, 1957 |